United States Patent
Conrardy et al.

(10) Patent No.: US 9,799,876 B2
(45) Date of Patent: Oct. 24, 2017

(54) BATTERY SYSTEM SAFETY SHIELD

(71) Applicant: C & C Power, Inc., Carol Stream, IL (US)

(72) Inventors: N. William Conrardy, Elmhurst, IL (US); James R. Lupinek, Streamwood, IL (US); William Fechalos, Aurora, IL (US); Christopher D. Heinz, Sycamore, IL (US); Paul Blake, Wauconda, IL (US); Michael Osko, Elgin, IL (US)

(73) Assignee: C & C POWER, INC., Carol Stream, IL (US)

( * ) Notice: Subject to any disclaimer, the term of this patent is extended or adjusted under 35 U.S.C. 154(b) by 0 days.

(21) Appl. No.: 15/340,555

(22) Filed: Nov. 1, 2016

(65) Prior Publication Data

US 2017/0047577 A1    Feb. 16, 2017

Related U.S. Application Data

(62) Division of application No. 14/538,359, filed on Nov. 11, 2014, now Pat. No. 9,570,732.

(Continued)

(51) Int. Cl.
*H01M 2/34*    (2006.01)
*H01M 2/10*    (2006.01)
*H01M 2/30*    (2006.01)

(52) U.S. Cl.
CPC ........... *H01M 2/34* (2013.01); *H01M 2/1077* (2013.01); *H01M 2/305* (2013.01);
(Continued)

(58) Field of Classification Search
None
See application file for complete search history.

(56) References Cited

U.S. PATENT DOCUMENTS 5,804,770 A    9/1998    Tanaka
2003/0039881 A1*    2/2003    Mount ............... H01M 2/1077
                                                    429/100

(Continued)

FOREIGN PATENT DOCUMENTS

JP    2002117821 A    4/2000

OTHER PUBLICATIONS

U.S. Non-Final Office Action for U.S. Appl. No. 14/538,359 dated Jun. 29, 2016, pp. 6.

(Continued)

*Primary Examiner* — Patrick Ryan
*Assistant Examiner* — Christopher Domone
(74) *Attorney, Agent, or Firm* — Brinks Gilson & Lione

(57) ABSTRACT

Storage batteries connected in series in an uninterruptable or back-up power supply system may have voltage potential differences between exposed terminals or conductors that exceed safety limits. A demountable insulating shield having apertures may be positioned so that the series string may be broken into a plurality of series sub-strings having a lesser potential difference has a cover over the aperture through which the series string configuration may be connected and disconnected. The cover may be an insulating material removably fastened to the insulating shield or a sliding cover that is captivated to the insulating shield. When the series string has been divided in to the sub-strings, the insulating shield may be demounted from the structure housing the batteries so that the batteries or their connections may be serviced.

8 Claims, 5 Drawing Sheets

Related U.S. Application Data

(60) Provisional application No. 61/907,676, filed on Nov. 22, 2013.

(52) U.S. Cl.
CPC .... *H01M 2200/00* (2013.01); *H01M 2220/10* (2013.01); *Y10T 29/49108* (2015.01)

(56) References Cited

U.S. PATENT DOCUMENTS

| | | |
|---|---|---|
| 2003/0143455 A1 | 7/2003 | Partington et al. |
| 2006/0076923 A1 | 4/2006 | Eaves |
| 2012/1257146 | 2/2012 | Muggeo |
| 2012/0058382 A1* | 3/2012 | Carignan .............. B60L 3/0007 429/158 |

OTHER PUBLICATIONS

Response to Non-Final Office Action for U.S. Appl. No. 14/538,359, filed Aug. 15, 2016, pp. 7.

* cited by examiner

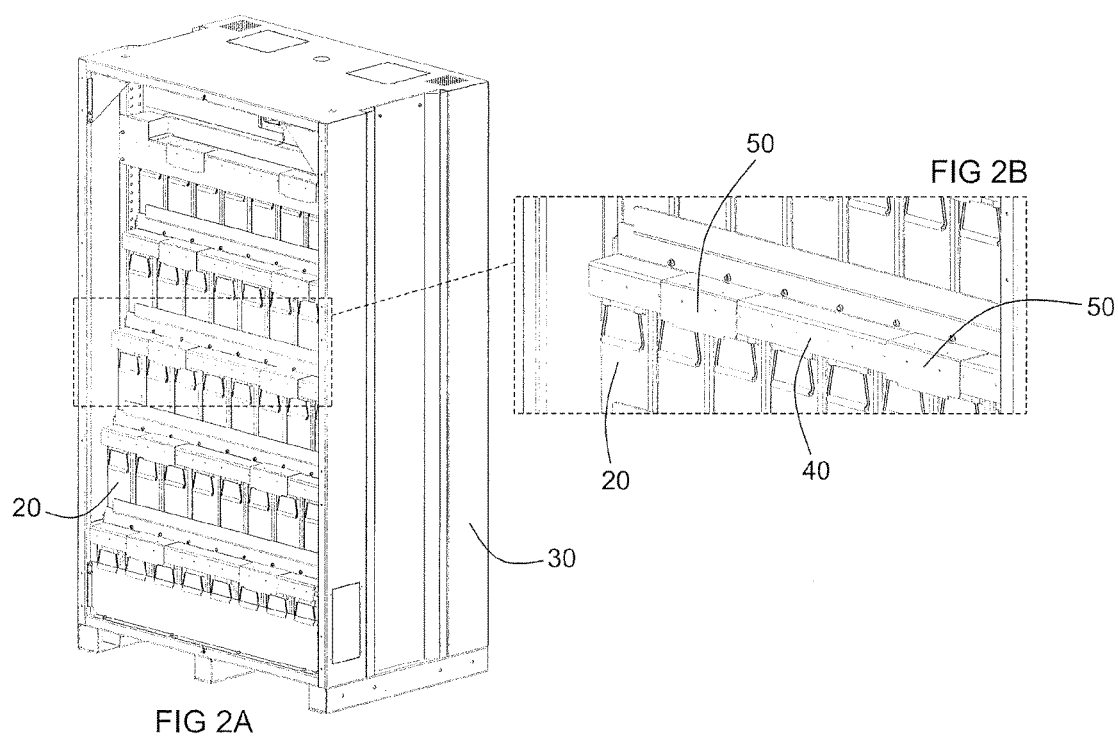

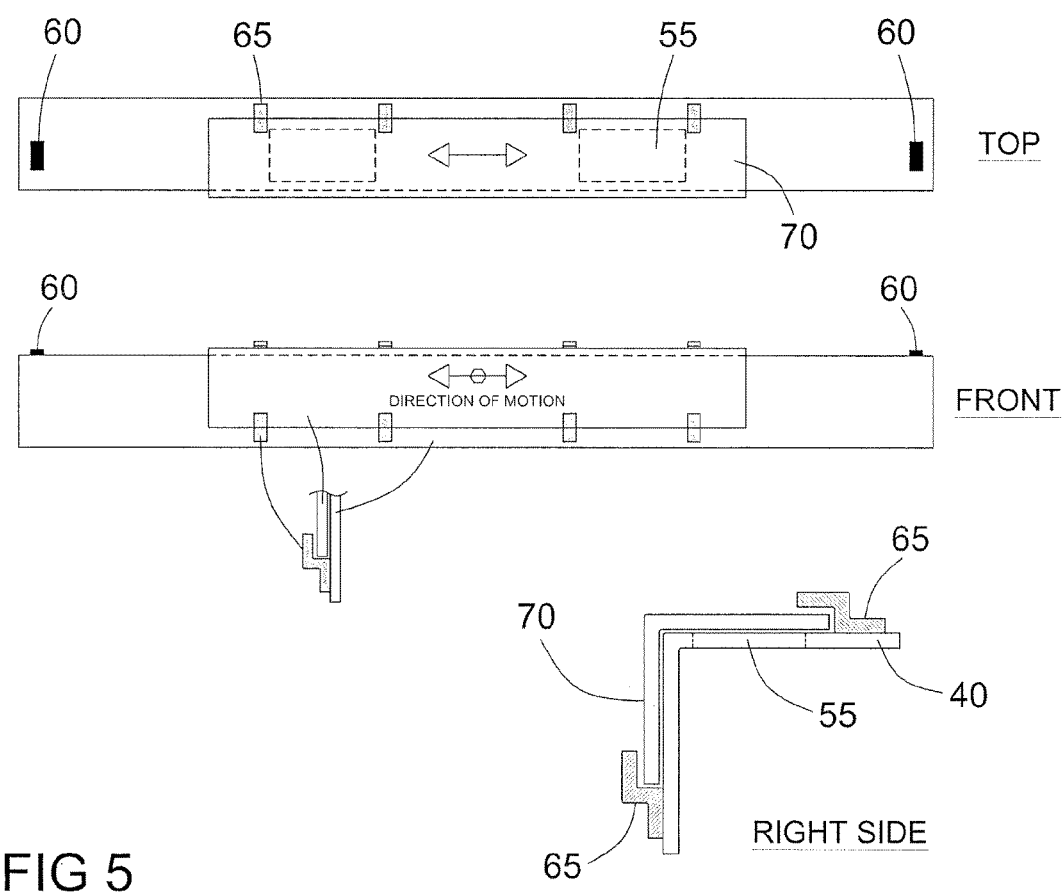

BATTERY SYSTEM SAFETY SHIELD

This application is a divisional application of U.S. Ser. No. 14/538,359, filed Nov. 11, 2014, now U.S. Pat. No. 9,570,732, issued Feb. 14, 2017, which claims the benefit of U.S. provisional application Ser. No. 61/907,676, filed on Nov. 22, 2013, each of which is incorporated herein by reference.

TECHNICAL FIELD

This application may have relevance to battery systems and the servicing of storage batteries as used in power supply systems.

BACKGROUND

Direct current (DC) power is needed for many types of telephone communication equipment, for control equipment used at electric utility substations, for computer data centers, power plants and other similar uses. The DC power may be supplied by a DC power source which may be supplied with AC power from an AC power source, such as the local power grid, or a generator and prime mover. Storage batteries may be utilized as a DC power source when a DC power source either cannot supply all the power required by the components or when the AC power supply or other external power source is not available, as during a power failure at the local electric utility or in the power distribution system. When the storage battery system is used as a backup power source, the batteries are recharged when the prime power or AC power is restored. In some cases the storage batteries are "floated" across the power bus so that they are continuously available.

The period of time where such battery backup is required may be reduced by providing local diesel-electric or turbine-powered electric generators. However, during the time where other backup power sources are unavailable or when switching between alternative prime power sources, standby storage batteries are needed.

A storage battery has an internal impedance, which includes resistive, inductive and capacitive components. When the battery is discharging, only DC is involved and the resistive component of the impedance is of interest as the discharge current produces a voltage drop across the internal resistance of the battery in accordance with Ohm's law. Over the life of the battery, the internal resistance will increase, at a rate determined by such factors as how many times the battery undergoes cycles of discharging and recharging, operating temperature, or the like. The internal resistance of any cell will eventually increase to a value where the voltage drop across the effective internal resistance during discharge is so great that the battery can no longer deliver power at its rated capacity. Other defects in the battery, or aging of the battery, may also result in degradation of the capacity of a battery to perform its function. Storage batteries may be subject to failure modes such as thermal runaway, degradation or failure of the outer case, internal short circuits, or the like. One or more of the installed storage batteries may need to be replaced during the lifetime of the backup power system. When series strings of storage batteries are used to increase the voltage being supplied or, in general, when batteries are connected in either series or parallel, the impedance of the overall string has an influence on the amount of energy that can be supplied. Other components of the physical assembly, including connecting links, terminal connections, supply cables and the like which can exhibit resistance, and have characteristics that may vary with time due to such factors as corrosion and changes in contact pressure, also contribute to the resultant battery system status. These ancillary components, including circuit breakers, sensors and the like, may also suffer from degradation and reduced performance or failure and require servicing.

Typical rechargeable storage batteries as used in a backup battery power supply system, for example, have a nominal terminal voltage of 12 VDC and a plurality of batteries may be connected in series so as to form a higher voltage power source. This is often done to reduce the current needed to provide a required power to the system being backed up, as the power is the product of the voltage and the current. But, this results in locations within a battery system where the voltage may be, for example, up to 480 VDC with respect to a ground or another location in the system. Such voltages are extremely dangerous to personnel and contact with such elevated potentials leads to serious injury and is often fatal. Consequently, safety regulations have been promulgated that may require safeguards against contact with elevated potentials, and which may require highly trained personnel, special procedures and formal maintenance permits. A maximum permitted voltage potential difference between accessible locations in a battery backup system is less than 50 VDC, without the special precautions or procedures. Other safety voltage limits may also be encountered.

Contact with the electrical circuit or components may be undesirable even in lower voltage applications where the high currents that the batteries are capable of supplying could lead to equipment damage, arcs, fire or other dangerous results.

SUMMARY

An apparatus for use in servicing a storage battery power supply system is described, where the storage battery system has a plurality of storage batteries whose electrical terminals may be connected in series such that the voltages in the storage battery system are greater than the voltage across the terminals of an individual storage battery. The storage batteries may be mounted in ranks in a cabinet or rack such that incidental contact with a location having a greater than a specified potential difference is prevented. For example, an enclosed cabinet with a lockable door may be used.

In an aspect, an insulating barrier may be provided on each rank, sized and dimensioned to prevent inadvertent contact with voltages by a person or a by a tool, where the voltage difference between two such contact points exceeds a safety limit. The insulating barrier may have an aperture therein positioned and sized such that when the non-conductive (insulating) cover is removed, access to a portion of the battery circuit is provided, including at least a terminal of the battery, which may include any attachment thereto so that a cable or a link can be used to connect the battery in series with another battery. The cover may be secured to the insulating barrier by a fastener.

In another aspect the aperture may be covered by a captivated insulating cover that is slidable from side-to-side along the insulating barrier. Where there is more than one aperture in the insulating barrier, the distance that the cover may be slid may be restrained so that only one aperture in the insulating barrier may be exposed at any time.

A method of servicing a battery-backup or uninterruptable power supply system having a plurality of storage batteries may include providing an insulating barrier sized and dimensioned so as to prevent inadvertent contact between two electrically conducting portions of the system having a potential greater than a predetermined voltage value. The insulating barrier may have apertures disposed such that connections between sub-strings of the series battery string may be accessed so as to be disconnected to break the series string.

In an aspect, the servicing method would include gaining access to the connections between sub-strings of the battery string by removing or sliding covers on the insulating barrier and disconnecting cables or links or bus bars such that the battery string is converted into a plurality of sub-strings, each substring having less than the predetermined potential difference between electrical conducting portions that may be contacted by a person or by a tool through the aperture in the insulating barrier.

In another aspect, where there is a plurality of ranks, or a plurality of apertures in each rank, the method may include accessing an aperture by removing or sliding a cover to expose the apertures one-at-a-time, breaking the connection between two batteries so as to form a substring of batteries, and (optionally) replacing the cover. The process may repeated until each of the apertures has been accessed and the remaining substrings have a potential difference that is less than the predetermined potential difference.

When the series battery string has been converted into a plurality of battery sub-strings with less than the predetermined potential difference, an insulating barrier for a rank of batteries may be dismounted from the structure supporting the batteries so that the batteries or connections of the rank of batteries may be serviced.

In an aspect, when a plurality of ranks are to be serviced, each rank may be serviced in sequence so that only one insulating barrier need be removed at any one time.

After completing the servicing of a rank, the insulating barrier may be re-mounted to the structure. When all of the insulating barriers have been re-mounted to the structure, the covers may be sequentially removed to permit the series strings to be reconnected, where each aperture re-covered after the connection is made.

Depending on other safety measures that may be employed, multiple insulating barriers may be removed at any time during the servicing or multiple apertures exposed by removing or sliding the cover. When the apertures are re-covered may depend on the details of the servicing procedure.

BRIEF DESCRIPTION OF THE DRAWINGS

FIG. 2 A shows a perspective view of a battery string in a rack; and, B, is a detail of the battery string showing an insulating shield with removable covers for each rank of batteries;

FIG. 5 illustrates an alternative shield and cover arrangement where the cover may be slid with respect to the apertures of the shield so as to expose one connecting link at a time.

DETAILED DESCRIPTION

Exemplary embodiments may be better understood with reference to the drawings, but these examples are not intended to be of a limiting nature. Like numbered elements in the same or different drawings perform equivalent functions. When a specific feature, structure, or characteristic is described in connection with an example, it will be understood that one skilled in the art may affect such feature, structure, or characteristic in connection with other examples, whether or not explicitly stated herein.

Figure 1:
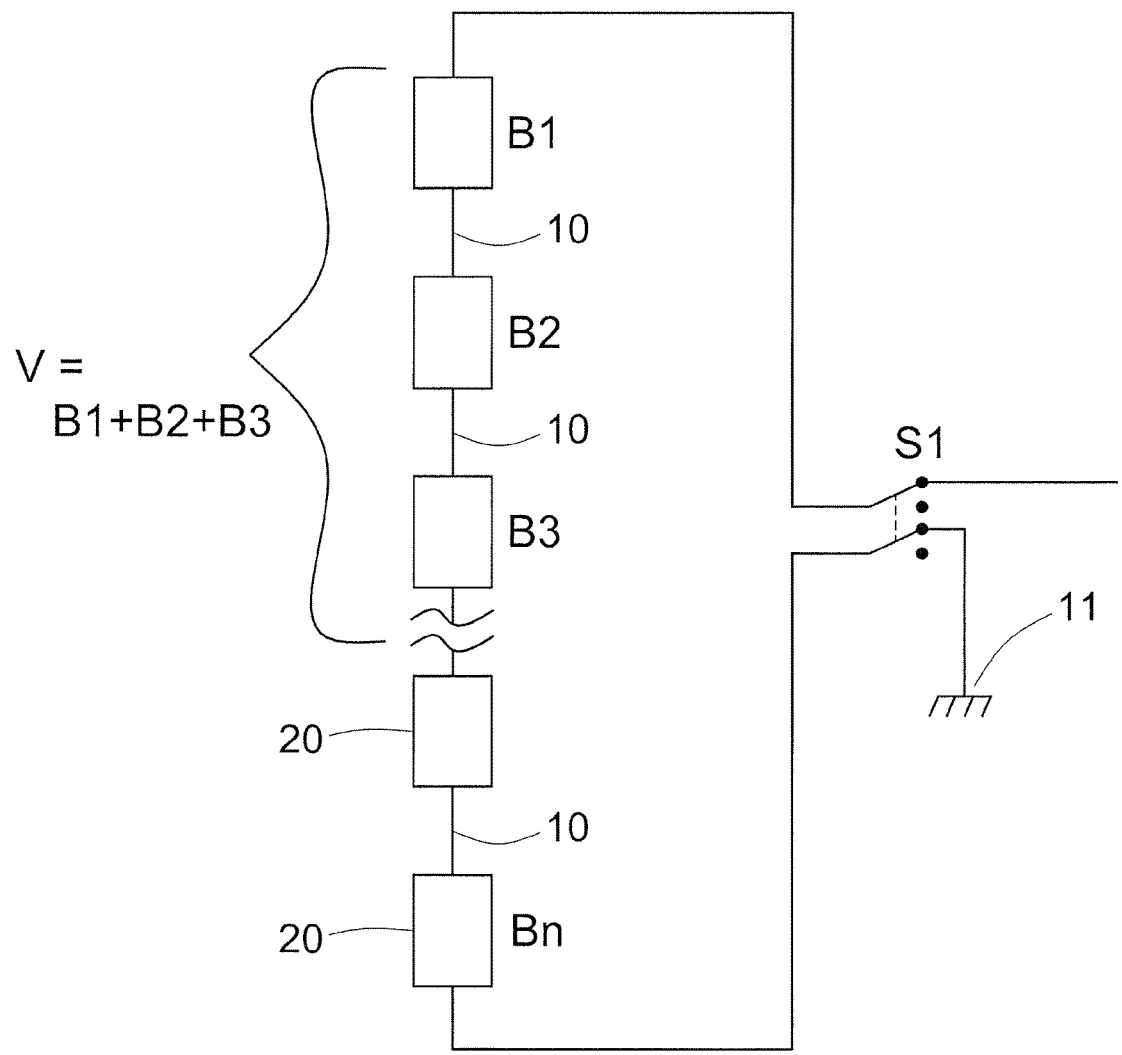
FIG. 1 is a single-line diagram showing an arrangement of batteries of a battery power supply in a series string.

FIG. 1 is a simplified electrical schematic diagram of a battery string of a backup power supply system 1, which may have a plurality of storage batteries 20 connected in series by using cables, metal links 10, or the like. One end of the battery string may be connected to a ground 11, which may be the frame of the cabinet 30 in which the storage batteries are housed. Alternatively, the positive and negative output cables from the backup power supply may be connected to the load without grounding one of the cables. This is a configuration known as "floating."

The batteries 20 in the string may be storage batteries of a sealed type or other rechargeable heavy-duty battery intended for service in a battery backup power supply as is known in the art. Such batteries are quite heavy, typically being of a lead-acid type, although other battery types may be used, such as large alkaline batteries, and described, for example in Article 480 of the National Electrical Code, NFPA 70 (see also, IEEE Guide for Batteries for Uninterruptible Power Supply Systems, IEEE Std. 1184-2006, IEEE, New York, N.Y.).

A battery system comprised of a plurality of storage batteries 20, where the maximum voltage potential different between different locations in the system can exceed the personnel safety limits for electrical installation may be configured as described herein. The disconnect switch S1 may be combined with, or be in addition to, a circuit breaker or fuse (not shown) intended to protect the battery string against overcurrent or to disconnect the string in the case of a thermal runaway or other catastrophic failure. Other aspects of the battery power supply system such as monitoring equipment, the cabinet or rack in which the batteries are housed and the like would be understood by a person of skill in the art and are not described in detail herein.

Storage batteries of a type used in uninterruptible power supply or backup batter power supply systems are often configured so as to have a 12 VDC nominal voltage potential between the two terminals of a battery 20, however other nominal voltage potentials are known. When a battery system 1 is to be serviced, the battery system 1 may be isolated from the remainder of the electrical system by opening the switch or circuit breaker S1. The maximum voltage potential between the exposed terminals of adjacent batteries 20 when connected in series and when the connection 10 is removed for servicing depends on the number of batteries connected in series between the connections with respect to another exposed terminal or with respect to ground in a grounded system. In an example, shown in FIG. 1, the voltage potential across the three batteries B1, B2, B3 would be 3×12=36 volts, nominal. In a 480 VDC power supply, a total of 40 such 12 VDC batteries would be connected in series. Depending on the particular points of contact between the person and conducting portions of the battery string, a potential difference of up to 480 VDC may be encountered. Such contact is dangerous and may often be fatal. This situation is typical of many such backup battery supply systems, and once installed, inadvertent access is prevented by lockable cabinet doors.

Even when the battery string has been isolated from the cabinet 30 and the ground 11, which are typically metal structures, a high voltage potential may exist between a battery and the cabinet or other exposed metal elements, if a failure mode of the battery is some form of failure of the battery case, permitting leakage of electrolyte and a current path to exist to the cabinet or ground. So, isolation of the battery string from the cabinet or ground itself may be insufficient to confidently and reliably ensure that a dangerous high voltage potential does not exist with respect to the cabinet.

Safety is an essential consideration in the design of equipment and the appropriate safety measures are often specified in industry standards, industrial product specifications, or governmental regulations. However, such requirements are usually functional and procedural in nature and permit a variety of design approaches and servicing procedures to satisfying the stated requirements. The development of a system meeting such requirements may involve both physical and procedural aspects so as to achieve the desired results. Such procedures may require elaborate specialized safety plans, extra personnel and obtaining official permits for each service.

Some battery backup systems may provide for insulating structures to be placed such that the links, cables 10, battery terminals 15 and the like are covered when the battery backup system is in use, so other portions of the system may be serviced without danger of contact with high voltages. However, when a storage battery 20 needs to be replaced, or the connections 10 between the batteries serviced, the insulating structures may need to be removed and this may create a dangerous situation.

FIG. 2A shows a front perspective view of a backup battery system of FIG. 1, where the batteries are disposed in 5 ranks of 8 batteries, and all of the batteries may be connected in series. The cabinet 30, a front door of which is not shown, provides for convenient access to the battery terminals and connections, as each rank of batteries is stepped back from the front if the cabinet as described in U.S. Pat. No. 8,100,271, entitled "Tiered Battery Cabinet", issued on Jan. 24, 2012, which is commonly owned and incorporated herein by reference. The cabinet may be fitted with a front door which may be lockable. Hence, when the battery cabinet is in routine use, personnel are physically prevented from coming in contact with the dangerous voltages.

Figures 3A, 3B:
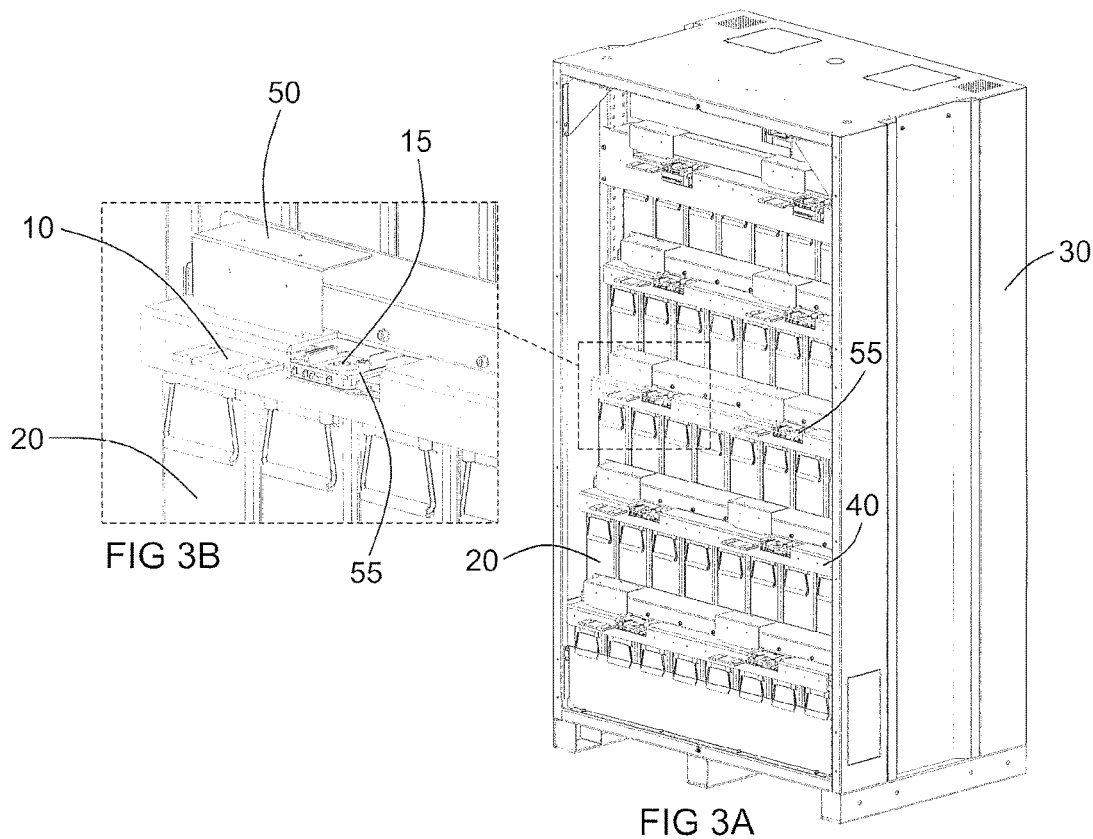
FIG. 3A shows the same perspective view as FIG. 2A with the covers removed.
FIG. 3B is a detail of the battery string with the cover removed so that a connecting link can be disconnected from a terminal of a battery.

An insulating barrier or shield 40 may be mounted to the cabinet 30 or battery support structure and positioned, for example, as shown in the detail of FIG. 2B such that the cables or links 10 connecting the batteries 20 may be covered when the shield 40 is installed. The shield 40 may be made of any suitable insulating (non-conductive) material such as, for example, polycarbonate. The shield 40 may run from side-to-side of the cabinet 30 for each of the ranks of batteries. A cover portion 50 of the shield 40 may be removable and cover an aperture 55 positioned such that a connection 10 between a pair of adjacent batteries 20 may be accessed (FIG. 3B). The positioning of the batteries 20 may be such that the connections 10 between the terminals 15 of batteries 20 may be accessed by removing the cover portion 50 so that the string of batteries may be divided into sub-strings comprising not more than, for example, four 12 VDC batteries in series, by disconnecting connections 10 between the terminals 15 of groups of batteries 20. When the cover potion 50 is removed it may be temporarily placed at a convenient location on the shield 40 as shown in FIG. 3B.

The specific shape of the insulating shield 40 and the method of attachment of the insulating shield 40 to the battery mounting arrangements of the cabinet 30 are design details that depend on the specific physical design of the battery system. Where the shield is fabricated from a moldable plastic, this may result in a shield as shown, with a flat top portion covering the battery terminals near the front top surface of the battery 20 and cable connections. The shield may also cover a top of the front face of the and extend in a downward direction parallel to a front surface plane of the battery 20 so as to prevent contact with the battery terminals 10 or other connections from the front.

The cabinet 30 shown in FIG. 2 is of a type where the ranks of storage batteries are stepped back at increasing distance from the front of the cabinet as the height of the rank increases from the base so that access to the battery terminal connections 15 may be gained from a location above the battery 20. Other cabinet configurations may be used, such as the conventional arrangement where the ranks of batteries are each at a same distance from the front of the cabinet. In this circumstance, the batteries are either fitted with electrical terminals on the front surface of the battery, near the top thereof, or link extensions provided from top-mounted terminals so that a connection may be made from the front of the battery. With such an arrangement, the removable insulating barrier may be a substantially flat sheet of insulating material disposed across the front surface of the batteries of a rank, being sized and dimensioned to prevent access to the electrical connections except when a cover of an aperture is removed or slid to provide access. The specific shape of the insulating barrier may accommodate horizontal portions as well so as to meet specific design requirements to prevent access from the top.

The aperture 55 may be, as shown, providing access from the top and the front of the battery 20, although access from either the top or the front may be adequate and the aperture 55 formed on only one surface of the insulating shield 40. The insulating shield 40 may not be continuous across the entire width of the rank of the batteries, so long as all of the points where high voltage is present in normal operation are protected against contact with personnel or servicing equipment.

The arrangements shown are for storage batteries 20 where the voltage connection terminals are on the top of the battery 20 near the front thereof. However, a person of skill in the art would recognize that batteries 20 where the connection was made to terminals 10 positioned near the top of the front face of the battery 20 could be similarly accessed. The dimensions and shape of the aperture 55 with respect to the remainder of the shield may vary.

The cover portion 50 may be removably fastened to the shield by any known method of fastening that facilitates removal of the cover portion 50 while firmly securing cover 50 when in normal operation. Using VELCRO strips, a hinge, captivated screws or the like, are examples of alternatives. Where a self-adhering strip such as VELCRO is used, a strip of one portion of the material may be provided with an adhesive backing and may be positioned on the shield 40 so as to captivate the insulating cover portion 50 having a corresponding portion of the material that is positionable opposite the strip on the insulating shield 40. An additional strip of material may be affixed to the shield 40 so as to provide a convenient place to temporarily place a removed cover 50.

FIG. 3A shows an example where two removable insulating covers 50 have been removed from each of the ranks. In practice, only one of the removable convers may be removed at any time so as to prevent inadvertent contact with other conductive portions of the system.

A procedure for servicing the batteries 20 may involve removing a first insulating cover 50 so as to access the connection 10 through an aperture 55 in the cover 40 and disconnecting the link 10 between terminals 15 of adjacent batteries 20 that has been exposed by removing the first cover 50 (FIG. 3B). The cover 50 may be affixed to the shield 50 by a hinge or strap, or may be a separate object that may be temporarily removed and placed elsewhere. The cover may be replaced so as to anticipate the reconnection of the batteries of the battery string, but some servicing procedures may replace the covers sequentially as the substrings are reconnected. A second cover 50, which may be on the same rank of batteries 20, for example, may then be removed and the corresponding link 10 disconnected. Since the covers 50, when removed one-at-a-time and then replaced, provide the protection against contact, any cover may be the next cover. However it should be appreciated that all of the links exposed by all of the covers would need to have been disconnected in order to ensure that the maximum potential was less than 50 VDC when the battery 20 is being replaced.

Thus, the cover 50 may be replaced and secured to the shield after the connection 10 has been disconnected, or left removed, depending on the specific servicing procedure. This procedure may be followed for each of the 5 ranks of batteries 20 of the battery string. FIG. 3A shows the battery cabinet 30 with all of the removable covers 50 removed, and all of the links 10 exposed by removing the removable convers 50 having been disconnected.

Figure 4:
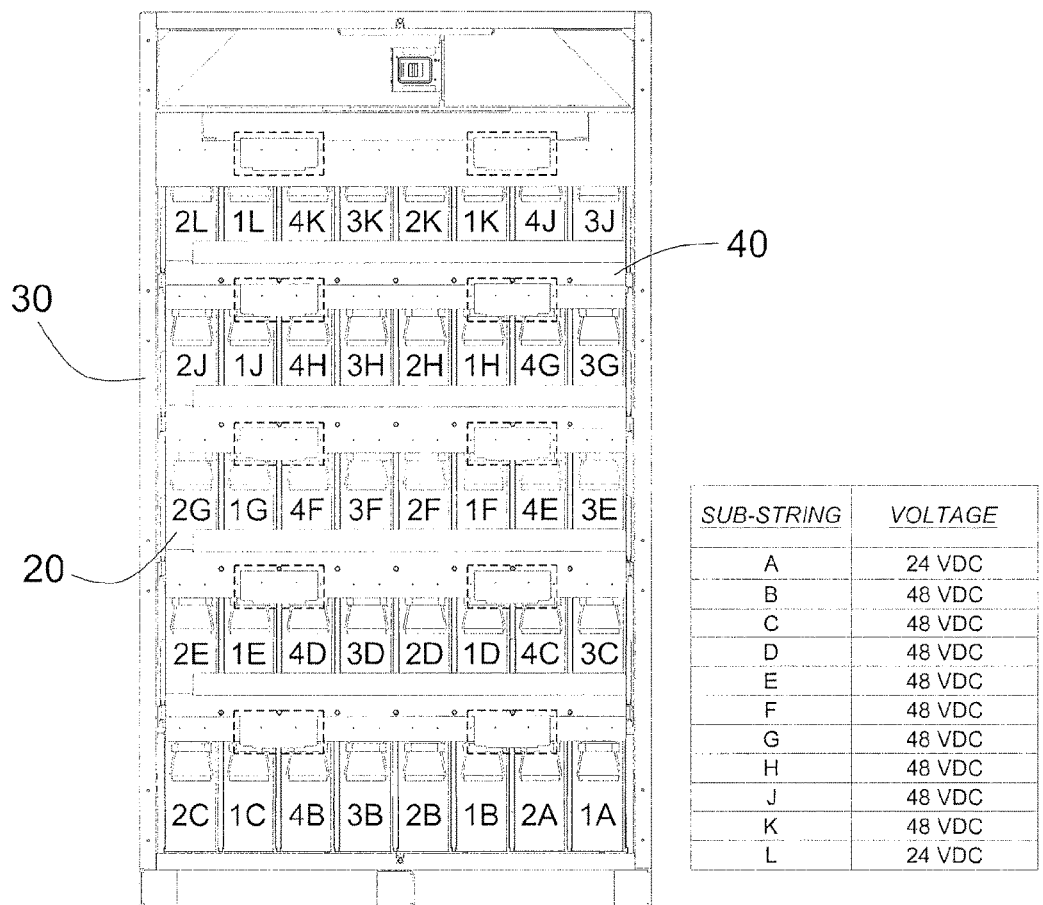
FIG. 4 is a front view of the rack with the battery string with an accompanying table of sub strings listing the voltage potential once the connecting links covered by the apertures have been removed.

When this is done, as shown in FIG. 4, no more than 4 batteries of the original battery string remain connected to each other, and the maximum potential difference between adjacent battery sub-strings, within a battery sub-string, or with respect to the rack is 48 VDC or less.

As these voltages are considered acceptably low, access to any battery 20 to be serviced may be safely provided. One or more of the insulating shields 40 may now be removed, although the insulating shields 40 for ranks of batteries where no servicing access is needed may be left in place to minimize the potential for shorting of exposed terminals 15. Other links 10 in a sub-string containing a battery to be replaced may be disconnected and a failed battery 20 removed and replaced. The link connections 10 may be individually tested or repaired, and other ancillary connections, such as may be part of battery monitoring systems, may be maintained or added.

When the maintenance has been completed, the shield or shields 40 may be reinstalled. After each link 10 is installed, the removable cover 50 associated with that link may be installed as well, so as the potential differences between access points are increased, the access points are covered. A non-limiting example of a safe method of doing this is to ensure that all of the removable covers 50 are in place prior to reconnecting the string, and to successively remove a single cover 50 and install the link 10 between adjacent terminals 15 of adjacent batteries 20.

In another aspect, the apertures may be covered with a slidable insulating cover 70, captivated to the insulating shield 40 so that the connection 10 between batteries 20 may be exposed by sliding the insulating cover along the a portion of the width of the rank of batteries. In an example such as FIG. 5, an insulating cover 55 may be slid in a direction towards a side of the rack 30 so as to expose a link 10 positioned in an aperture 55 disposed further towards the opposite side of the rack 30. The apertures 55, and the insulating cover 70 are sized and dimensioned so that when the first connection 10 is exposed, the position of the insulating cover 70 continues to cover the other aperture 55. Once the first connection 10 has been disconnected, the insulating cover 70 may be slid back to the other side of the rack, exposing the other aperture 55 to expose the second connection 10 of the rank. In this arrangement the adjacent apertures 55 are not simultaneously exposed. This may simplify the servicing protocol.

The insulating shield 40 of FIG. 5 is shown as having an aperture 55 on the top surface thereof, however configurations having an aperture on the vertical surface or extending from the top surface to the vertical surface as shown in FIG. 3 may be used depending on the location of the battery terminals 15 and other access requirements. The cover 70 is shaped as an "L", however if the aperture 55 is on one surface of the insulating shield 40, the cover 70 may be a flat plate. The extent of sliding of the cover 70 towards the side of the rack 30 may be limited by a stop 60 positioned to limit the motion of the cover 70 so that only one aperture 55 is exposed at any time. The cover 70 may be captivated to the insulating shield 40 by tabs 65 positioned to restrain the cover so that it cannot be detached from the insulating shield 40. The use of tabs 65 is only one example of a sliding interface between the cover 70 and the insulating shield 40. The tabs may be deformed so that a smaller contact area between the tab 65 and the cover 70 is created so as to reduce the sliding friction between the two members. A bearing surface may be formed behind the cover 70 on the insulating shield 40 so as to minimize frictional forces.

In an aspect, when the batteries are mounted in an arrangement where the ranks are not stepped back, and the insulating shield 40 is a substantially vertical sheet of material extending across a portion of the height of the front surface of the battery rank, the aperture 55 and the cover 70 may be disposed only on the vertical sheet of material.

A further safety measure may include providing a lock with a captivated key and using the same key for all of the ranks of batteries.

It is therefore intended that the foregoing detailed description be regarded as illustrative rather than limiting, and that it be understood that it is the following claims, including all equivalents, that are intended to define the spirit and scope of this invention.

What is claimed is:

1. A storage battery back-up power supply system, comprising:
    a plurality of storage batteries having electrical terminals, the terminals of at least some of the storage batteries of the plurality of storage batteries connected in series;
    a removable non-conductive barrier having a non-conductive portion extending along a rank of batteries of the plurality of storage batteries and disposed to prevent contact with electrically conducting portions of the system having a voltage difference therebetween and an aperture to provide access to at least a terminal of a storage battery or a connection between storage batteries; and
    a non-conductive cover sized and dimensioned to prevent access to the terminal or connection when the non-conductive cover is disposed over the aperture.

2. The system of claim 1, wherein the non-conductive cover is capable of being secured to the non-conductive barrier by a fastener.

3. The system of claim 2, wherein a spacing between apertures in a rank of storage batteries is such that a value of the voltage differences between the storage battery terminals or inter-storage-battery connections exposed by a removal of the non-conductive cover is less than a nominal 50 VDC.

4. The system of claim 2, wherein a spacing between adjacent apertures is such that a value of the voltage difference between storage battery terminals or inter-storage-battery connections of adjacent apertures is less than a nominal 50 VDC.

5. The system of claim 1, wherein the non-conductive cover has a length such that adjacent apertures are covered when the non-conductive cover is in a first position and motion of the cover is constrained such that only one of the adjacent apertures is uncovered when the non-conductive cover is moved to a second position.

6. The system of claim 5, wherein the non-conductive cover is captivated to the non-conductive barrier such that it is slidable in a direction joining the adjacent apertures.

7. The system of claim 6, wherein a stop is provided such that the slidable movement uncovers only one aperture at a time.

8. The system of claim 7, wherein the non-conductive cover has a lock capable of engaging the non-conductive barrier, the lock having a captive key mechanism such that, when the non-conductive cover is slidable with respect to the apertures of the non-conductive barrier, a key of the lock is captivated by the lock, and the key is removable when the non-conductive element is fixed in a position where the apertures are covered.

* * * * *